United States Patent
Muraki

(10) Patent No.: US 7,853,745 B2
(45) Date of Patent: Dec. 14, 2010

(54) ELECTRONIC SYSTEM WITH REMOVABLE COMPUTING DEVICE AND MUTABLE FUNCTIONS

(75) Inventor: Yosuke Muraki, Campbell, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 253 days.

(21) Appl. No.: 11/678,520

(22) Filed: Feb. 23, 2007

(65) Prior Publication Data

US 2008/0204991 A1    Aug. 28, 2008

(51) Int. Cl.
 *G06F 13/00*    (2006.01)

(52) U.S. Cl. .............. 710/303; 710/60; 361/679.3; 361/679.41

(58) Field of Classification Search .............. 710/301, 710/302, 303, 60, 304, 315; 348/207.99; 361/679.3, 679.41, 679.46
See application file for complete search history.

(56) References Cited

U.S. PATENT DOCUMENTS

| | | | | |
|---|---|---|---|---|
| 5,237,676 A * | 8/1993 | Arimilli et al. | .............. | 710/110 |
| 5,884,049 A * | 3/1999 | Atkinson | .............. | 710/303 |
| 5,922,056 A * | 7/1999 | Amell et al. | .............. | 710/16 |
| 6,003,100 A | 12/1999 | Lee | | |
| 6,026,458 A * | 2/2000 | Rasums | .............. | 710/302 |
| 6,088,730 A * | 7/2000 | Kato et al. | .............. | 709/227 |
| 6,192,480 B1 * | 2/2001 | Barrus | .............. | 713/320 |
| 6,216,185 B1 * | 4/2001 | Chu | .............. | 710/303 |
| 6,282,596 B1 | 8/2001 | Bealkowski et al. | | |
| 6,519,707 B2 * | 2/2003 | Clark et al. | .............. | 713/322 |
| 6,532,506 B1 * | 3/2003 | Dunstan et al. | .............. | 710/100 |
| 6,571,308 B1 * | 5/2003 | Reiss et al. | .............. | 710/315 |
| 6,601,179 B1 * | 7/2003 | Jackson et al. | .............. | 713/322 |
| 6,658,508 B1 * | 12/2003 | Reiss et al. | .............. | 710/100 |
| 6,691,197 B2 * | 2/2004 | Olson et al. | .............. | 710/304 |
| 6,839,778 B1 * | 1/2005 | Sartore et al. | .............. | 710/60 |
| 6,895,470 B2 | 5/2005 | San et al. | | |
| 7,013,163 B2 * | 3/2006 | Jaggers et al. | .............. | 455/557 |
| 7,032,053 B2 | 4/2006 | Himmel et al. | | |
| 7,069,347 B1 * | 6/2006 | Kolokowsky | .............. | 710/8 |
| 7,124,321 B2 | 10/2006 | Garnett et al. | | |
| 7,313,711 B2 * | 12/2007 | Bullman | .............. | 713/322 |
| 7,345,671 B2 * | 3/2008 | Robbin et al. | .............. | 345/156 |
| 7,363,519 B2 * | 4/2008 | Liebenow | .............. | 713/300 |
| 7,599,177 B2 * | 10/2009 | Jaffe et al. | .............. | 361/679.41 |
| 7,631,126 B2 * | 12/2009 | Barake et al. | .............. | 710/105 |
| 2003/0005201 A1 * | 1/2003 | Olson et al. | .............. | 710/303 |
| 2004/0150944 A1 * | 8/2004 | Byrne et al. | .............. | 361/683 |
| 2007/0101039 A1 * | 5/2007 | Rutledge et al. | .............. | 710/303 |
| 2007/0103222 A1 * | 5/2007 | Kim et al. | .............. | 327/291 |
| 2007/0286432 A1 * | 12/2007 | Shin et al. | .............. | 381/77 |

(Continued)

OTHER PUBLICATIONS

Koninklijke Philips Electronics N.V.Philips Docking system for iPhone/iPod. DC290. Version 1.0.2. Jul. 13, 2010.*

(Continued)

*Primary Examiner*—Mark Rinehart
*Assistant Examiner*—Matthew D Spittle
(74) *Attorney, Agent, or Firm*—Mikio Ishimaru

(57) ABSTRACT

An electronic system is provided including providing a receptacle, inserting a removable computing device into the receptacle, adjusting based on the removable computing device, and operating a feature based on the removable computing device.

20 Claims, 3 Drawing Sheets

U.S. PATENT DOCUMENTS

2008/0253079 A1* 10/2008 Robinson et al. ............ 361/686

OTHER PUBLICATIONS

Buffalo Technology. Buffalo Dualie. Data Sheet. 2010.*
Xantech Corporation. XIS100 Integration Dock for iPod. Installation Instructions. 2009.*
Motorola. Motorola USBw 200 Docking Station. Data Sheet. 2010.*
Beam Communications Pty Ltd. RST310 9505A IntelliDOCK Docking Station. Installation and User Manual. Version 5. Jun. 2007.*
Manninger, Mario. Power Management for Portable Devices. IEEE. 2007.*

* cited by examiner

ELECTRONIC SYSTEM WITH REMOVABLE COMPUTING DEVICE AND MUTABLE FUNCTIONS

TECHNICAL FIELD

The present invention relates generally to electronic systems and more particularly to electronic systems with removable computing device.

BACKGROUND ART

Modern consumer electronics, such as game consoles, notebook computers, smart phones, personal digital assistants, and location based services devices, as well as enterprise class electronics, such as servers, storage arrays, and routers, are packing more integrated circuits into an ever shrinking physical space with expectations for decreasing cost. Contemporary electronics expose integrated circuits to more demanding and sometimes new environmental conditions, such as cold, heat, and humidity requiring the overall system to provide robust thermal management solutions. Higher performance, more functions, lower power usage, and longer usage off battery power are yet other expectations upon contemporary electronics.

Competitive market pressures often push companies to provide the latest and the greatest available technologies in their electronic products. Some of these technologies include integrated circuits such as processors, central processing unit (CPU), or graphics processing unit (GPU). These same competitive market pressures often push companies to provide cost reduction of the newest technologies in their products. In addition, market competition may push for other improvements in the electronics such as performance, features, and operation under battery power.

The time span from product conception to development to production and through end of life may require the development platform to differ from the production platform. For example, a product may be conceived with a processor that is not yet available. During product development, a prototype version of the processor may be used to develop and debug the product. The prototype version may not have all the functionality designed or working. The product may enter production with yet a different version of the processor. The initial production version may differ from the prototype version in a number of ways, such as more functionality. While in production, the product may undergo enhancement from the original production release product. The enhancements may include a faster and longer battery life processor. However, existing products cannot take advantage of any improvements or advancements made in enhanced processor since they were built with the processor available at that time.

Thus, a need still remains for an electronic system with a dynamic feature selection based on processor upgrades providing lower power consumption, longer battery life operation, lower cost manufacturing, improved yield, higher reliability, and additional features for the electronic systems. In view of the ever-increasing need to save costs and improve efficiencies, it is more and more critical that answers be found to these problems.

Solutions to these problems have been long sought but prior developments have not taught or suggested any solutions and, thus, solutions to these problems have long eluded those skilled in the art.

DISCLOSURE OF THE INVENTION

The present invention provides an electronic system including providing a receptacle, inserting a removable computing device into the receptacle, adjusting based on the removable computing device, and operating a feature based on the removable computing device.

Certain embodiments of the invention have other aspects in addition to or in place of those mentioned or obvious from the above. The aspects will become apparent to those skilled in the art from a reading of the following detailed description when taken with reference to the accompanying drawings.

BEST MODE FOR CARRYING OUT THE INVENTION

Figure 1A:
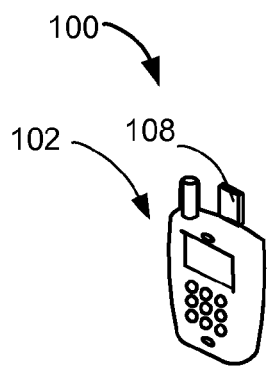
FIGS. 1A, 1B, and 1C are schematic views of examples of electronic systems in embodiments of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail. Likewise, the drawings showing embodiments of the system are semi-diagrammatic and not to scale and, particularly, some of the dimensions are for the clarity of presentation and are shown greatly exaggerated in the drawing FIGs. In addition, where multiple embodiments are disclosed and described having some features in common, for clarity and ease of illustration, description, and comprehension thereof, similar and like features one to another will ordinarily be described with like reference numerals.

For expository purposes, the term "horizontal" as used herein is defined as a plane parallel to the plane or surface of the integrated circuit, regardless of its orientation. The term "vertical" refers to a direction perpendicular to the horizontal as just defined. Terms, such as "above", "below", "bottom", "top", "side" (as in "sidewall"), "higher", "lower", "upper", "over", and "under", are defined with respect to the horizontal plane. The term "on" means there is direct contact among elements. The term "system" as used herein means and refers to the method and to the apparatus of the present invention in accordance with the context in which the term is used.

Figure 1B:
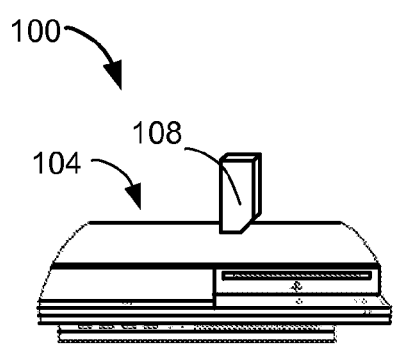
Figure 1C:
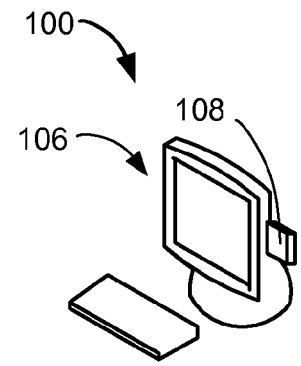

Referring now to FIGS. 1A, 1B, and 1C, therein are shown schematic views of examples of electronic systems 100 in embodiments of the present invention. A smart phone 102, a game console 104, and a computer system 106 are examples of the electronic systems using the present invention. The electronic systems 100 may be any system that performs any function, such as for the creation, transportation, storage, and consumption of information. For example, the smart phone 102 may create information by transmitting voice to the computer system 106 or consume information by playing a game with the game console 104. The smart phone 102, the game console 104, and the computer system 106 may be used to store the information. Other electronic systems (not shown) may be used to transport information amongst the smart phone 102, the game console 104, and the computer system 106.

The smart phone 102, the game console 104, and the computer system 106 each has a removable computing device 108 that plugs into the smart phone 102, the game console 104, and the computer system 106, respectively. The removable computing device 108 provides the processing function for the smart phone 102, the game console 104, and the computer system 106. The smart phone 102, the game console 104, and the computer system 106 do not contain a processing device, such as a central processing unit, a graphics processing unit, or a general purpose programmable integrated circuit, other than the removable computing device 108.

For illustrative purposes, the removable computing device 108 that plugs into the smart phone 102, the game console 104, and the computer system 106 is shown substantially the same. Although it is understood that the removable computing device 108 that plugs into the smart phone 102, the game console 104, and the computer system 106 may each be different, such as different form factor or different components.

Figure 2:
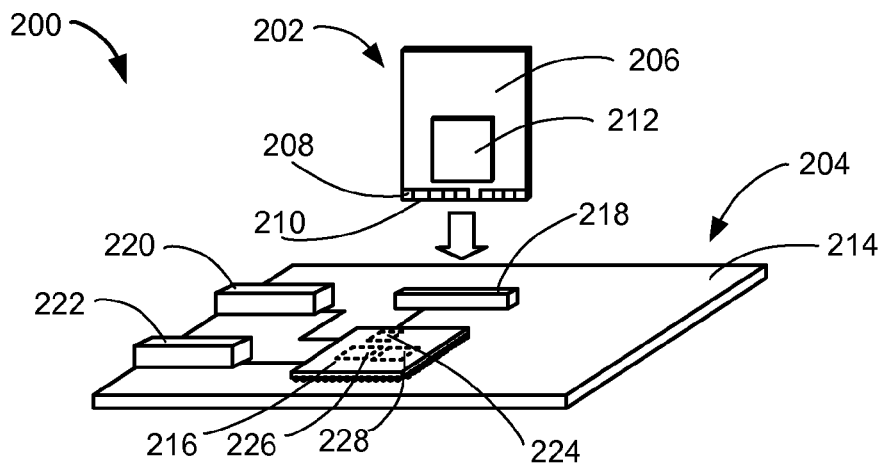
FIG. 2 is a block diagram of an electronic assembly system in an embodiment of the present invention.

Referring now to FIG. 2, therein is shown a block diagram of an electronic assembly system 200 in an embodiment of the present invention. The electronic assembly system 200 may be part of any one of the electronic systems 100 of FIG. 1. The block diagram depicts a removable computing device 202 undergoing insertion into a platform 204.

The removable computing device 202 is shown as a card 206, such as a pluggable card, having electrical contacts 208, such as metallic fingers, at an insertion edge 210 of the card 206. The card 206 may be formed as a number of electrical mounting structures, such as a printed circuit board or a laminated substrate.

The card 206 preferably includes a computing device 212, such as a processor, central processing unit, a graphics processing unit, or a specialized computing integrated circuit. The computing device 212 may be a packaged integrated circuit mounted on the card 206. Alternatively, the computing device 212 may be housed or encapsulated in the card 206.

The platform 204 preferably includes a substrate 214, such as a printed circuit board, having a device 216, a receptacle 218, a first interface module 220, and a second interface module 222. The platform 204 does not include a processor, such as a central processing unit or a graphical processor that is included in the removable computing device 202. The platform 204 can receive the removable computer device 202 preferably connected to the receptacle 218.

The device 216 is preferably an integrated circuit providing interface function with the removable computing device 202, the first interface module 220, and the second interface module 222. The device 216 may also include memory (not shown), such as volatile or non-volatile memory. The device 216 may include adjustment circuitry 224 depicted as a dotted rectangle near the periphery.

The adjustment circuitry 224 preferably includes input and output circuitry for communication with the removable computing device 202. The adjustment circuitry 224 preferably provide various communication protocols, such as signaling protocol, signaling levels, drive currents, or signaling frequency, that may be adjusted for communication with the removable computing device 202.

For example, the removable computing device 202 may include a different version of the computing device 212 having a different input/output frequency and signaling levels. The electronic assembly system 200 with the device 216 recognizes the different version of the computing device 212 and adjusts as needed for the version of the computing device 212 that is plugged into the receptacle 218. The adjustment circuitry 224 may be implemented in a number of different ways, such as with analog circuitry, digital circuitry, or mixed-signal circuitry.

The device 216 also preferably provides other functions for the electronic assembly system 200 and the electronic systems 100 which include the electronic assembly system 200. The device 216 may recognize the version of the removable computing device 202 and may adapt features provided by the electronic assembly system 200. The device 216 may include enablement circuitry 226 depicted as a dotted rectangle not at the periphery. The enablement circuitry 226 preferably enable features provided or supported by the electronic assembly system 200 based on the version of the removable computing device 202 that is inserted in the receptacle 218.

For example, the device 216 and the electronic assembly system 200 may provide different displays, such as different or additional graphical rendering, or offer different capabilities, such as different number of players or opponents in a gaming context. Other different types of features may be enabled beyond providing substantially the same features operating at different speeds based on the speed of the version of the removable computing device 202 that is plugged in the receptacle 218.

The device 216 preferably includes recognition circuitry 228 performing a number of functions and depicted as a dotted rectangle not at the periphery. For example, the recognition circuitry 228 may detect insertion of the removable computing device 202 into the receptacle 218. Also, the recognition circuitry 228 may also detect power on state of the removable computing device 202. The recognition circuitry 228 preferably cooperates with the adjustment circuitry 224 and the enablement circuitry 226 for the operation of the removable computing device 202 in the electronic assembly system 200.

For illustrative purposes, the adjustment circuitry 224, the enablement circuitry 226, and the recognition circuitry 228 are shown as distinct, although it is understood that the adjustment circuitry 224, the enablement circuitry 226, and the recognition circuitry 228 may not be distinct from each other. For example, the functions or portions of the functions of the adjustment circuitry 224, the enablement circuitry 226, and the recognition circuitry 228 may share all or a portion of the circuitry from each other.

The first interface module 220 preferably provides an interface with the platform 204. For example, the first interface module 220 may provide an external interface to a human interface device, such as a display. The second interface module 222 may also preferably provide another interface with the platform 204. As an example, the second interface module 222 may provide another external interface to another human interface device, such as an input mechanism.

The receptacle 218 may preferably be an electrical connector for providing electrical and mechanical interface with the removable computing device 202. For illustrative purposes, the receptacle 218 is shown providing an interface structure for the removable computing device 202 that is perpendicular to the platform 204, although it is understood that the receptacle 218 may provide the interface structure for the removable computing device 202 that is not perpendicular to the platform 204, such as parallel to the platform 204.

Figure 3:
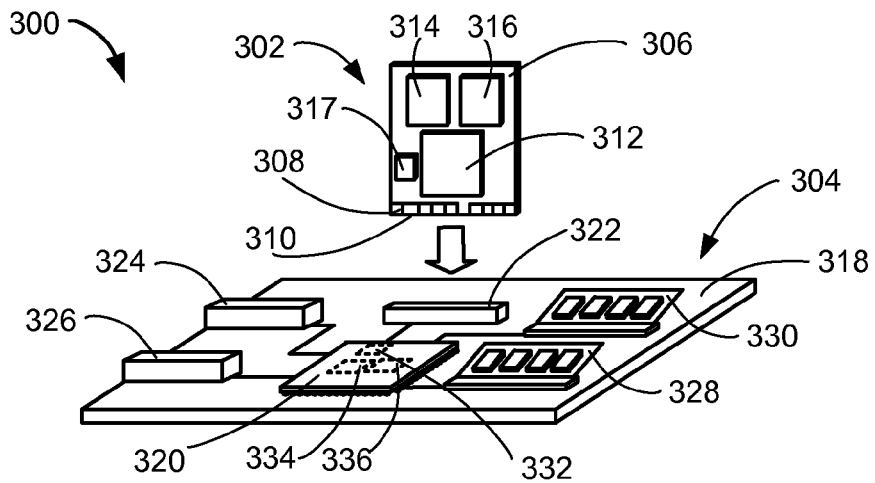
FIG. 3 is a block diagram of an electronic assembly system in an alternative embodiment of the present invention.

Referring now to FIG. 3, therein is shown a block diagram of an electronic assembly system 300 in an alternative embodiment of the present invention. The electronic assembly system 300 may be part of any one of the electronic systems 100 of FIG. 1. The block diagram depicts a removable computing device 302 undergoing insertion into a platform 304.

The removable computing device 302 is shown as a card 306, such as a pluggable card, having electrical contacts 308, such as metallic fingers, at an insertion edge 310 of the card 306. The card 306 may be formed as a number of electrical mounting structures, such as a printed circuit board or a laminated substrate.

The card 306 preferably includes a computing device 312, such as a processor, central processing unit, a graphics processing unit, or a specialized computing integrated circuit. The computing device 312 may be a packaged integrated circuit mounted on the card 306. Alternatively, the computing device 312 may be housed or encapsulated in the card 306.

The card 306 also preferably includes a first integrated circuit 314 and a second integrated circuit 316. The first integrated circuit 314 may provide a volatile memory for the computing device 312 or the electronic assembly system 300. The second integrated circuit 316 may provide a non-volatile memory for the computing device 312 or the electronic assembly system 300. Alternatively, the first integrated circuit 314 and the second integrated circuit 316 may be other computing devices and function cooperatively with the computing device 312 for providing a multi-processor system.

The card 306 may also preferably include a translation circuitry 317. The translation circuitry 317 may interface to the computing device 312, the first integrated circuit 314, the second integrated circuit 316, the electrical contacts 308, or a combination thereof. The translation circuitry 317 may be implemented in a number of different ways, such as analog circuitry, digital circuitry, or mixed-signal circuitry. The translation circuitry 317 may serve a number of functions.

For example, the translation circuitry 317 may optionally function as a clock generator for an external clock or a reference clock for the computing device 312, the first integrated circuit 314, the second integrated circuit 316, or a combination thereof. The clock from the translation circuitry 317 may be multiplied, divided, or scaled within the computing device 312, the first integrated circuit 314, and the second integrated circuit 316. The clock scaling function may be modified or adjusted by the platform 304.

Another example, the translation circuitry 317 may optionally function as a voltage regulator for the removable computing device 302 including the computing device 312, the first integrated circuit 314, the second integrated circuit 316, or a combination thereof. The voltage regulator enables the removable computing device 302 to tolerate system design ranges of the platform 304, such as noise from the platform 304 due to impedance mismatches.

For illustrative purposes, the translation circuitry 317 is shown as a separate device included with the card 306, although it is understood that the translation circuitry 317 may not be separate. For example, the translation circuitry 317 function may be included in the computing device 312, the first integrated circuit 314, the second integrated circuit 316, or a combination thereof. Also, a portion of the translation circuitry 317 may also remain as an external circuitry.

The platform 304 preferably includes a substrate 318, such as a printed circuit board, having a device 320, a receptacle 322, a first interface module 324, a second interface module 326, a first memory 328, and a second memory 330. The platform 304 does not include a processor, such as a central processing unit or a graphical processor that is not included in the removable computing device 302.

The device 320 is preferably an integrated circuit providing interface function with the removable computing device 302, the first interface module 324, the second interface module 326, the first memory 328, and the second memory 330. The device 320 may also include memory (not shown), such as volatile or non-volatile memory. The device 320 may adjust the clock scaling function included in the removable computing device 302. The device 320 may also include adjustment circuitry 332 depicted as a dotted rectangle near the periphery.

The adjustment circuitry 332 may include input and output circuitry for communication with the removable computing device 302. The adjustment circuitry 332 may provide various communication protocols, such as signaling protocol, signaling levels, drive currents, or signaling frequency that may be adjusted for communication with the removable computing device 302.

For example, the removable computing device 302 may include a different version of the computing device 312 having a different input/output frequency and signaling levels. The electronic assembly system 300 with the device 320 recognizes the different version of the computing device 312 and adjusts as needed for the version of the computing device 312 that is plugged into the receptacle 322. The adjustment circuitry 332 may be implemented in a number of different ways, such as with analog circuitry, digital circuitry, or mixed-signal circuitry.

The device 320 also preferably provides other functions for the electronic assembly system 300 and the electronic systems 100 which include the electronic assembly system 300. The device 320 may recognize the version of the removable computing device 302 and may adapt features provided by the electronic assembly system 300. The device 320 may include enablement circuitry 334 depicted as a dotted rectangle not at the periphery. The enablement circuitry 334 preferably enable features provided or supported by the electronic assembly system 300 based on the version of the removable computing device 302 that is inserted in the receptacle 322.

For example, the device 320 and the electronic assembly system 300 may provide different displays, such as different or additional graphical rendering, or offer different capabilities, such as different number of players or opponents in a gaming context. Other different types of features may be enabled beyond providing substantially the same features operating at different speeds based on the speed of the version of the removable computing device 302 that is plugged in the receptacle 322.

The device 320 preferably includes recognition circuitry 336 performing a number of functions and depicted as a dotted rectangle not at the periphery. For example, the recognition circuitry 336 may detect insertion of the removable computing device 302 into the receptacle 322. Also, the recognition circuitry 336 may also detect power on state of the removable computing device 302. The recognition circuitry 336 preferably cooperates with the adjustment circuitry 332 and the enablement circuitry 334 for the operation of the removable computing device 302 in the electronic assembly system 300.

For illustrative purposes, the adjustment circuitry 332, the enablement circuitry 334, and the recognition circuitry 336 are shown as distinct, although it is understood that the adjustment circuitry 332, the enablement circuitry 334, and the recognition circuitry 336 may not be distinct from each other. For example, the functions or portions of the functions of the adjustment circuitry 332, the enablement circuitry 334, and the recognition circuitry 336 may share all or a portion of the circuitry from each other.

The first interface module 324 preferably provides an interface with the platform 304. For example, the first interface module 324 may provide an external interface to a human interface device, such as a display. The second interface module 326 may also preferably provide another interface with the platform 304. As an example, the second interface module 326 may provide another external interface to another human interface device, such as an input mechanism.

The receptacle 322 may preferably be an electrical connector providing electrical and mechanical interface with the removable computing device 302. For illustrative purposes, the receptacle 322 is shown providing an interface structure for the removable computing device 302 that is perpendicular to the platform 304, although it is understood that the receptacle 322 may provide the interface structure for the removable computing device 302 that is not perpendicular to the platform 304, such as parallel to the platform 304.

The first memory 328 and the second memory 330 provides storage for the electronic assembly system 300. The first memory 328 and the second memory 330 may be substantially the same type of memory technologies, such as volatile or non-volatile memory, or may be different. The first memory 328 or the second memory 330 as well as the device 320 may contain the different features that may be selected based on the version of the removable computing device 302.

Figure 4:
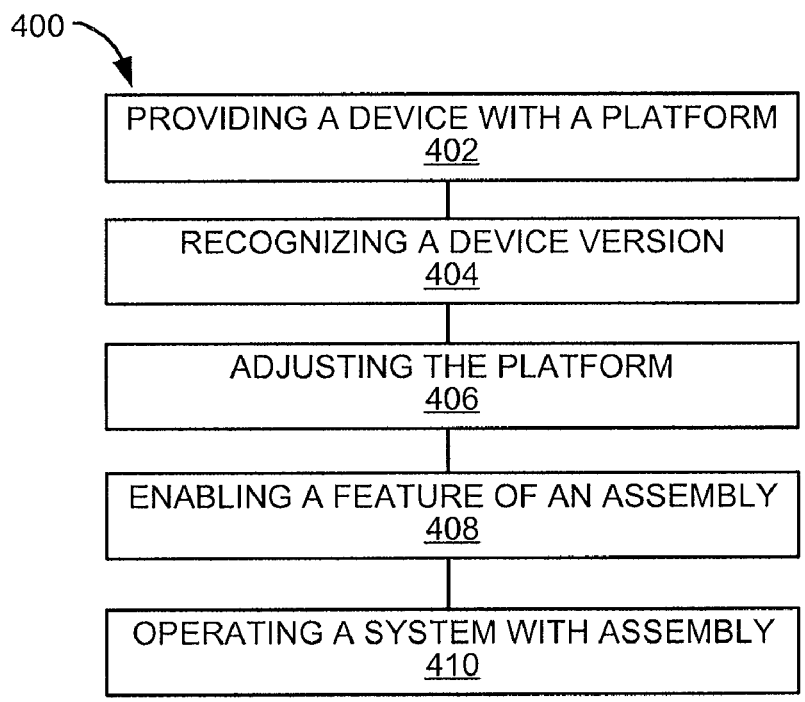
FIG. 4 is a flow chart of an electronic assembly system for operation of the electronic assembly system of FIG. 2 in an embodiment of the present invention.

Referring now to FIG. 4, therein is shown a flow chart of an electronic assembly system 400 for operation of the electronic assembly system 200 of FIG. 2 in an embodiment of the present invention. The system 400 includes providing a removable computing device with a platform in a block 402, recognizing a version of the removable computing device in a block 404; adjusting the platform based on the version in a block 406; enabling a feature of an electronic assembly having the removable computing device and the platform in a block 408; and operating an electronic system having the electronic assembly with the feature in a block 410.

Figure 5:
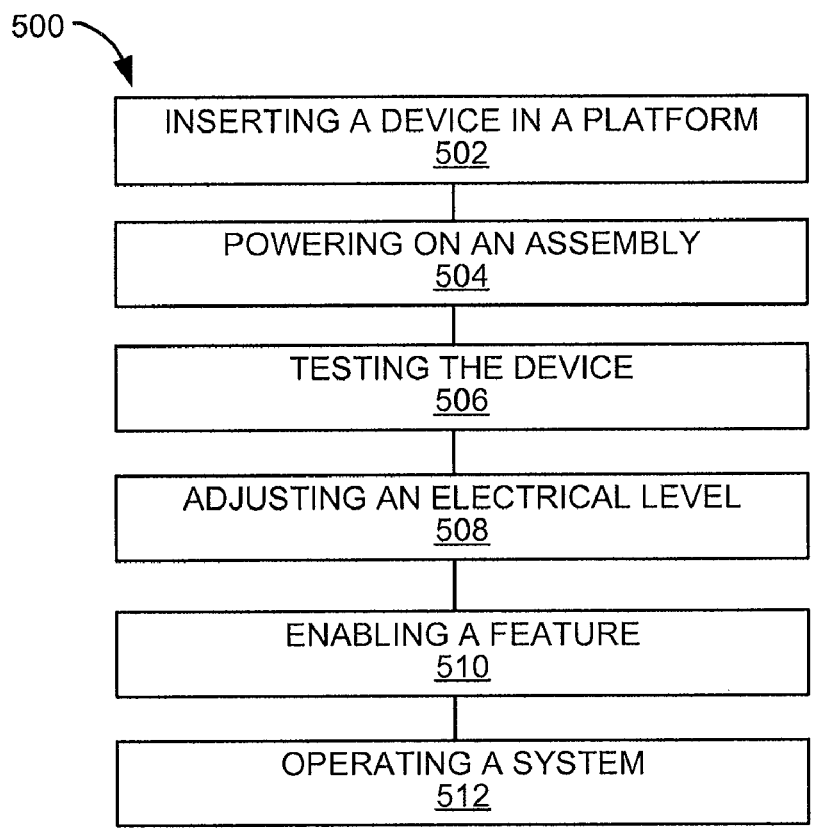
FIG. 5 is a flow chart of an electronic assembly system for operation of the electronic assembly system of FIG. 2 in an alternative embodiment of the present invention.

Referring now to FIG. 5, therein is shown a flow chart of an electronic assembly system 500 for operation of the electronic assembly system 200 of FIG. 2 in an alternative embodiment of the present invention. The system 500 includes inserting a removable computing device in a platform in a block 502; powering on an electronic assembly having the removable computing device and the platform in a block 504; testing the removable computing device, including the platform executing a test program to test the removable computing device, the removable computing device executing a self diagnostic, or a combination thereof, in a block 506; adjusting an electrical level from the platform based on the testing including adjusting the electrical level based on the result of the testing in a block 508; enabling a feature of the electronic assembly based on the testing in a block 510; and operating an electronic system having the electronic assembly with the feature in a block 512.

Figure 6:
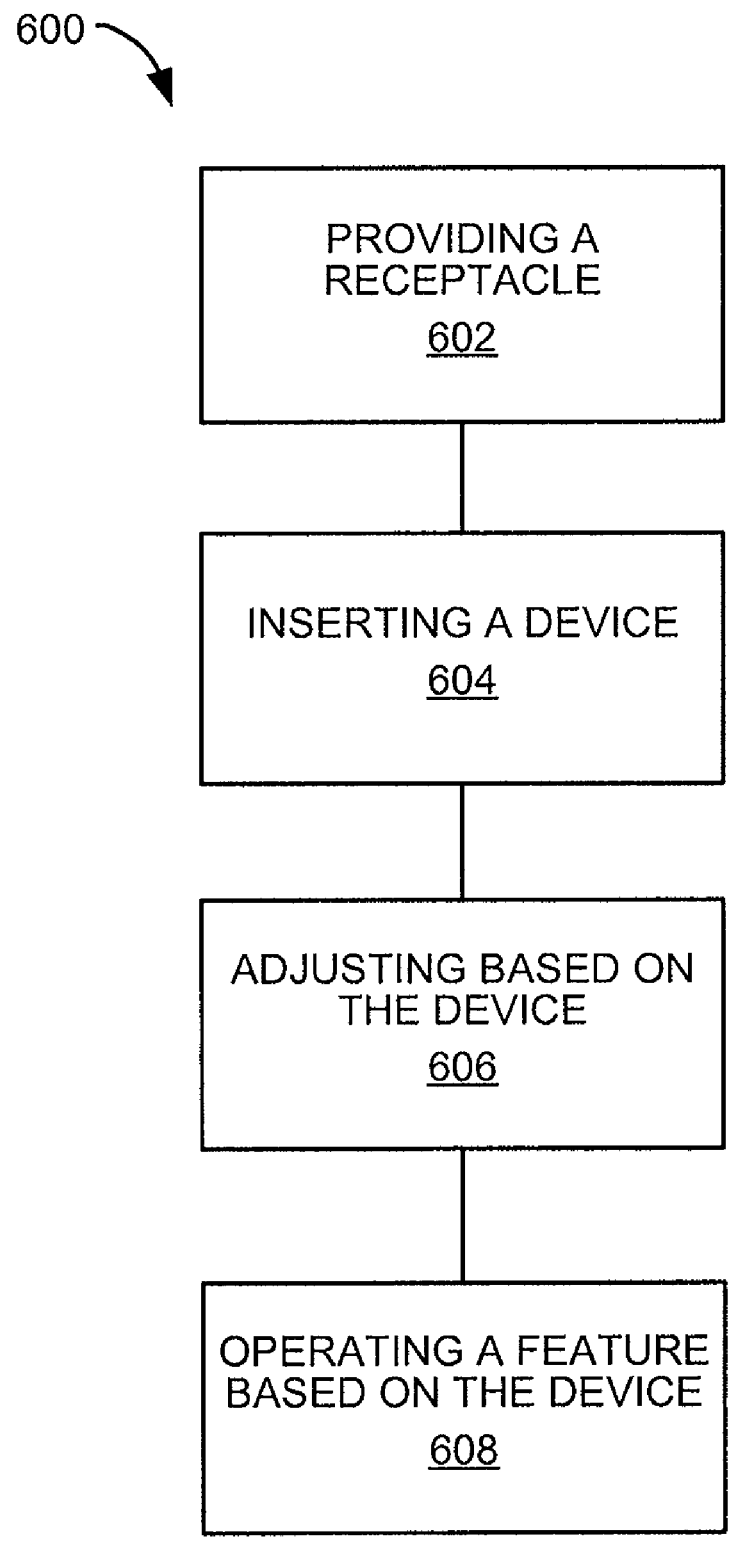
FIG. 6 is a flow chart of an electronic system for operation of the electronic system in an embodiment of the present invention.

Referring now to FIG. 6, therein is shown a flow chart of an electronic system 600 for operation of the electronic systems 100 in an embodiment of the present invention. The system 600 includes providing a receptacle in a block 602; inserting a removable computing device into the receptacle in a block 604; adjusting based on the removable computing device in a block 606; and operating a feature based on the removable computing device in a block 608.

Yet other important aspects of the embodiments include that it valuably supports and services the historical trend of reducing costs, simplifying systems, and increasing performance.

These and other valuable aspects of the embodiments consequently further the state of the technology to at least the next level.

Thus, it has been discovered that the electronic system of the present invention furnishes important and heretofore unknown and unavailable solutions, capabilities, and functional aspects for improving reliability in systems. The resulting processes and configurations are straightforward, cost-effective, uncomplicated, highly versatile, and effective, can be implemented by adapting known technologies, and are thus readily suited for efficiently and economically manufacturing stackable integrated circuit package system.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hitherto set forth herein or shown in the accompanying drawings are to be interpreted in an illustrative and non-limiting sense.

What is claimed is:

1. A method for operating an electronic system comprising:
   providing a platform without a processor and including a receptacle and a device;
   receiving a removable computing device into the receptacle;
   adjusting operating speed of the removable computing device by the device of the platform based on the removable computing device; and
   operating a feature based on the removable computing device.

2. The method as claimed in claim 1 wherein providing the receptacle includes providing a substrate having the receptacle thereon and without a computing device.

3. The method as claimed in claim 1 wherein the adjusting includes interfacing a device and the removable computing device through the receptacle.

4. The method as claimed in claim 1 wherein the adjusting includes:
   recognizing a power-on of the removable computing device; and
   adjusting an electrical level between a device connected to the receptacle and the removable computing device.

5. The method as claimed in claim 1 wherein operating the feature based on the removable computing device includes selecting the feature enabled by a version of the removable computing device.

6. A method for operating an electronic system comprising:
   providing a substrate having a receptacle and a device thereon without a computing device;
   receiving a removable computing device into the receptacle;

adjusting operating speed of the removable computing device by the device of the platform based on a power-on recognition of the removable computing device;

enabling a feature based on the removable computing device; and operating the feature for displaying.

7. The method as claimed in claim 6 wherein providing the removable computing device includes providing a card having a processor in the receptacle.

8. The method as claimed in claim 6 wherein providing the substrate includes providing a memory device having the feature.

9. The method as claimed in claim 6 wherein providing the substrate includes providing an interface module connected with the removable computing device.

10. The method as claimed in claim 6 wherein providing the removable computing device includes providing a card having a memory in the receptacle.

11. An electronic system comprising:
   a platform without a processor and including a receptacle and a device;
   a removable computing device receivable by the receptacle;
   operating speed of the removable computing device adjusted by the device of the platform based on the removable computing device; and
   an enablement circuitry for enabling a feature based on the removable computing device.

12. The system as claimed in claim 11 wherein the receptacle includes a substrate having the receptacle thereon and without a computing device.

13. The system as claimed in claim 11 further comprising a device connected with the removable computing device through the receptacle.

14. The system as claimed in claim 11 further comprising a recognition circuitry for recognizing a power-on of the removable computing device.

15. The system as claimed in claim 11 wherein the enablement circuitry for enabling the feature based on the removable computing device includes the feature enabled by a version the removable computing device.

16. The system as claimed in claim 11 wherein:
   the receptacle is a connector;
   the removable computing device includes a processor connected to the receptacle;
   the adjustment circuitry is in a device for adjusting the electrical interface of the device based on the removable computing device;
   the enablement circuitry is in the device for enabling the feature based on the removable computing device; and
further comprising:
   a substrate having the receptacle and the device thereon.

17. The system as claimed in claim 16 wherein the removable computing device includes a card having the processor in the receptacle.

18. The system as claimed in claim 16 wherein the substrate includes a memory device having the feature.

19. The system as claimed in claim 16 wherein the substrate includes an interface module connected with the removable computing device.

20. The system as claimed in claim 16 wherein the removable computing device includes a card having a memory.

* * * * *